Oct. 14, 1958    W. S. MILLER    2,856,596
MAGNETIC CONTROL SYSTEMS
Filed Dec. 20, 1954
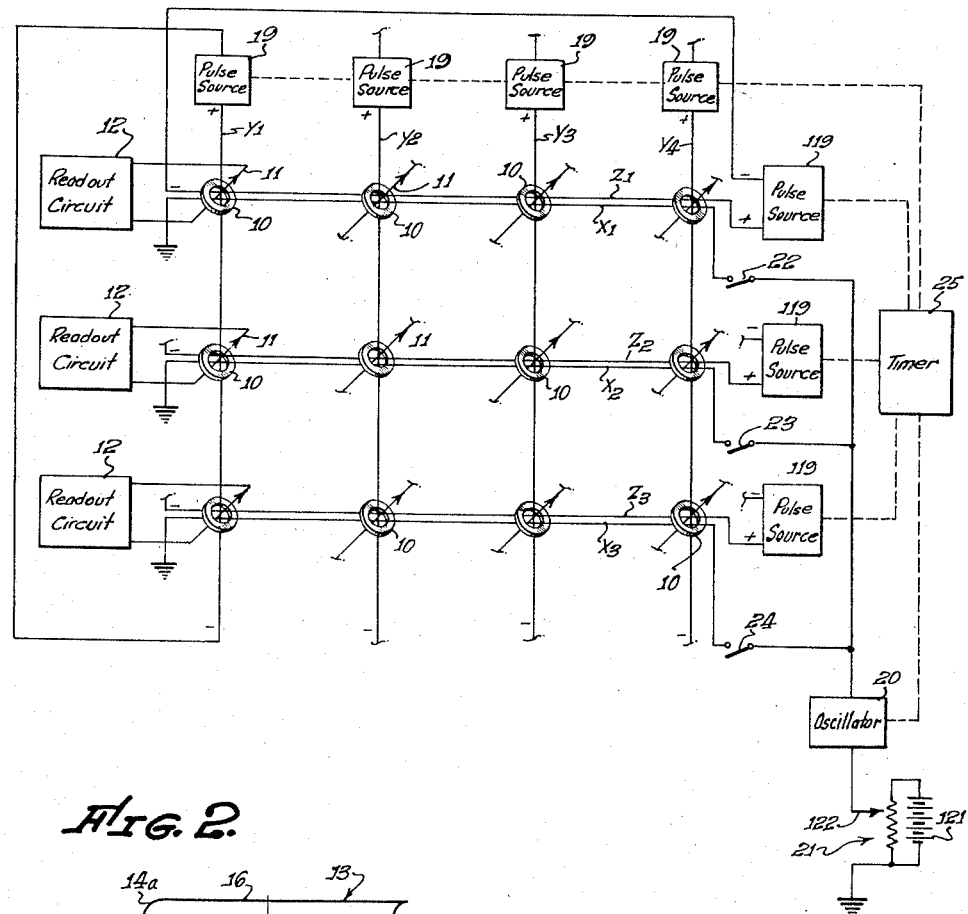
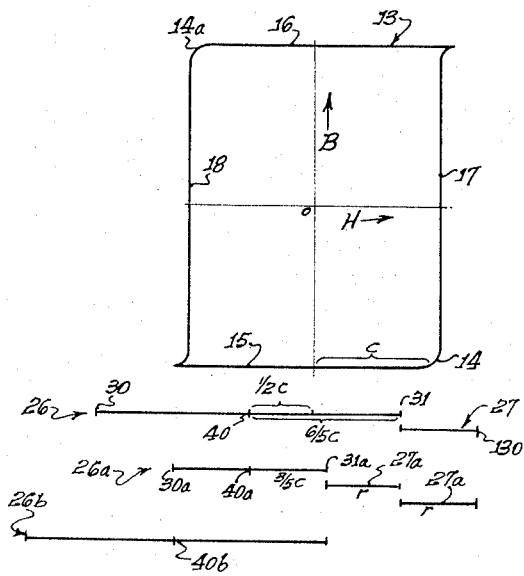
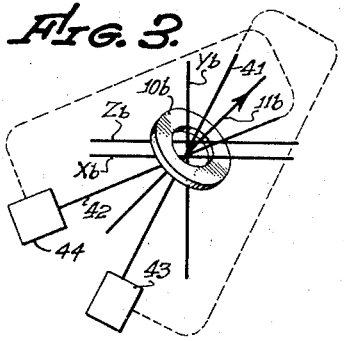
WENDELL S. MILLER,
INVENTOR,
By William P. Green
ATTORNEY.

United States Patent Office 2,856,596
Patented Oct. 14, 1958

2,856,596

MAGNETIC CONTROL SYSTEMS

Wendell S. Miller, Beverly Hills, Calif.

Application December 20, 1954, Serial No. 476,126

9 Claims. (Cl. 340—174)

This invention relates to improved magnetic control systems in which a number of cores respond magnetically to electric pulses or signals fed into the device, and act to control output pulses in accordance with such magnetization of the cores. Usually, the cores are arranged in a matrix or pattern, in which each input line extends past a number of different cores, to simultaneously partially energize all of those cores, with different input lines extending along different axes through the matrix and intersecting at predetermined cores. Some features disclosed in this application are claimed in my copending application Ser. No. 476,127 on "Electronic Gang Switches" filed of even date herewith.

In apparatus embodying the invention, input pulses are supplied to the individual cores by electrical energization of input wires which pass in flux linkage relation with the cores. The parts may be so designed that a single current pulse in a single line or conductor will not actuate an associated core or cores to a predetermined magnetic condition, whereas a combination of pulses in a combination of lines will so actuate a core. The actuation of the core when such a combination of pulses occurs is then picked up by a read-out line which passes by or through the energized core (the core usually being a ring).

An important object of the invention is to provide a unique pulse input system which is so designed as to render the apparatus very versatile as to the manner of output indication which may be obtained. As will appear, I prefer to provide, in conjunction with each of the individual cores, at least two separately energizable signal input conductors adapted to receive separate electrical pulses, in combination with an additional input conductor which is also separately energizable and acts as a control line. The nature of the pulses fed to the control line may be utilized to determine what type of indication will be obtained by the output line. For instance, the control pulses may be of such a nature as to obtain actuation of the core, and consequently an output pulse, only if both of the other input lines are simultaneously energized (an "and" circuit). On the other hand, the control pulses may be chosen, if desired, to obtain an output pulse if either of the other input lines is energized (an "or" circuit). Further, where more than two inputs are employed, in addition to the control input, the apparatus may serve to indicate whether a predetermined number, say one, two or three, of the total number of input lines are energized (an "X out of Y" indication). Preferably, the apparatus is so designed that the character of the control pulses may be easily varied as desired, to allow easy shifting of the apparatus to different conditions for giving any of the above discussed indications.

An additional object of the invention is to provide a pulse input system which will allow for automatic return or resetting of a core to a normal magnetic condition after each time that it is temporarily energized to a predetermined second or actuated condition by a particular input pulse or pulses. Also, it is desired to employ an input system which results in amplification of the output pulse to a maximum extent. These results are attained by utilization of a control pulse having both an A. C. component and a D. C. component, with the former desirably being greater than the latter. These components may be of such intensities as to normally energize the core in a predetermined direction, with the core being temporarily energizable in the opposite direction only when a predetermined auxiliary pulse is supplied by another input line. This unique type of control pulse may in certain instances be utilized with only one other input line (associated with each core), but is particularly effective where at least two other inputs are employed in the manner discussed above. In that case, variation in the intensity of the A. C. component, will serve by itself to vary the type of output indication obtained, as between an "and" indication, an "or" indication, or an "X out of Y" indication.

The above and other features and objects of the present invention will be better understood from the following detailed description of the typical embodiments illustrated in the accompanying drawings in which:

Fig. 1 is a schematic representation of an electronic control system constructed in accordance with the invention.

Fig. 2 is a representation of the hysteresis curve of the magnetic cores utilized in the Fig. 1 switch arrangement, together with representations of the pulses which are impressed on the signal input wires of Fig. 1 for causing a shift in the magnetic state of the cores, and Fig. 3 is a fragmentary representation of a variational form of the invention.

Referring first to Fig. 1, I have there shown an electronic control or magnetic memory system embodying the invention, which system may comprise a portion of a relatively complex electronic computer system. To simplify and clarify the present disclosure, I have included in Fig. 1 only as much of the over all computer mechanism as is necessary to an understanding of the functioning of the invention. The apparatus of Fig. 1 comprises a number of individual cores 10 of magnetizable material, preferably taking the form of small rings, as shown. These cores may be arranged in both horizontal and vertical rows, there typically being shown three horizontal rows and four vertical rows. The cores are magnetically energizable by three sets of pulse input lines which extend through the cores, the first set of lines or conductors being designated X1, X2 and X3, the second set of conductors being designated Y1, Y2, Y3 and Y4, and the third set being designated Z1, Z2 and Z3.

The magnetic signals impressed on cores 10 are read from the cores by individual read-out lines 11, each extending through only one of the cores. Each of the read-out lines 11 is connected to an individual read-out circuit 12, which is adapted to produce a desired indication or to effect a desired control action, in response to energization of the associated core 10. For simplicity of illustration, only three of the read-out circuits 12 have been represented in Fig. 1, but it will of course be understood that other similar circuits are provided for the other read-out lines 11. The cores 10 and the various input and read-out conductors are of course mounted to a suitable frame (not shown) adapted to hold these various elements in the illustrated relative positions. The cores and wires are spaced apart sufficiently far to assure that no core will be affected substantially by the magnetic field from any other core, or by the field from any wire other than the particular wires which pass through that core. Similarly, no read-out wire 11 is affected magnetically by any element other than the particular core through which it passes, and the input wires which also pass through that same core.

Each of the vertical conductors Y1, Y2, Y3 and Y4 extends through the cores 10 of only one of the vertical rows of cores. Similarly, each of the conductors X1, X2 and X3, and each of the cores Z1, Z2 and Z3, extends through only the cores in one of the horizontal rows. Consequently, there extends through each of the cores 10 one X wire, one Y wire, and one Z wire, which wires are in flux linkage relation with the core, and therefore control its magnetic state.

The various X, Y and Z input lines are supplied with controlled electric pulses, which are utilized to shift the various cores from one magnetic state to the opposite magnetic state. The cores and pulse sources are so designed that no single pulse from any one of the X, Y or Z wires is of sufficient strength to shift the core magnetically to its actuated condition; and yet a predetermined plurality of simultaneous pulses in different wires passing through a particular core are sufficient to actuate that core. In this connection, attention is called to Fig. 2, which represents at 13 the preferred hysteresis loop of the cores 10. As seen in that figure, the cores 10 are preferably formed of an electrically magnetizable material whose hysteresis loop is of the high loss type, and has a rather sharp bend or "knee" at points 14 and 14a. The hysteresis loop 13 is desirably of the illustrated substantially rectangular configuration, having substantially horizontal bottom and top sides 15 and 16, and having two substantially vertical sides 17 and 18. A suitable material for the purpose is the product sold by General Ceramics under the designation Ferramic S1 or S3.

Preferably, each of the cores 10 is normally maintained magnetized in one direction, typically the direction of the magnetic state represented by the lower line 15 in the Fig. 2 hysteresis loop. To simplify the discussion, this magnetic state represented at 15 may be termed a "negative" magnetic state, or negatively driven state, while the condition represented by upper line 16 may be called a "positive" state. As will be understood, in order to actuate any one of the cores from negative state 15 to positive state 16, the magnetizing force H, or magnetizing current, must be sufficiently great to drive the core past bend 14 of the hysteresis loop, following which the core abruptly changes to the positive state represented at 16. The pulses fed to lines X1, X2 and X3 are insufficient by themselves to cause the core to pass bend 14, but will do so in combination with pulses from the Y and/or Z lines.

Unidirectional or direct current pulses are supplied separately to the various Y lines by individual pulse sources 19, which may typically be other portions of same overall computing mechanism of which the illustrated cores and wires are a part. The positive side of each pulse source 19 may be connected to the upper end of the corresponding Y wire, while the negative side of the pulse source may be connected to the lower end of the same wire. To simplify the drawing, the negative line has only been shown in one of the Y circuits of Fig. 1, but it will be understood that corresponding negative lines are actually provided in each of the other Y circuits. Additional pulses are supplied to the Z wires from individual unidirectional pulse sources 119, which are connected to the Z wires in essentially the same manner that sources 19 are connected to the Y wires.

The three X lines are adapted to serve as control or switching lines and may be selectively connectible to a common pulse source. This pulse source preferably supplies to the X lines a composite electrical current or pulse, having an A. C. component biased by a D. C. component. The A. C. component may be supplied by an oscillator 20, which is connected in series with a D. C. source, comprising a potentiometer or voltage divider 21 connected across a battery 121. The three X lines are individually connectible to power sources 20 and 21 by means of control switches 22, 23 and 24. A timer 25 may be provided for timing the pulses from sources 19, and 119, the timer desirably being operated by or in accordance with the current fluctuations of oscillator 20, to synchronize the X wire pulses with the Y and Z wire pulses in a manner to be discussed more specifically at a later point.

The oscillator 20 is preferably so designed as to be adjustable to produce alternating currents of any of various current magnitudes. Also, movement of the voltage dividing contact 122 on potentiometer 21 allows for adjustment of the direct current component or bias supplied to the X lines.

In Fig. 2, I have represented at 26 the pulses which are fed to the X lines by oscillator 20 and battery 21 in one setting of the oscillator, and I have represented at 27 the magnitude of the D. C. current pulses which are fed to the Y lines by sources 19, and to the Z lines by sources 119. The pulses 26 have a D. C. component supplied by battery 21, which component biases the A. C. cycle leftward to the point 40 in Fig. 2. The A. C. component is preferably greater than the D. C. component. The combined A. C. and D. C. components of pulses 26 provide a magnetizing force H which fluctuates between a left limit 30 and a right limit 31. When pulse 26 reaches its left limit 30 the magnetizing force H is sufficiently great in a negative direction to cause the associated core 10 to magnetically pass upper bend 14a of the hysteresis loop, and thus actuate the core to its negative driven state represented at 15. This is true even though there may be no pulse 27 supplied by the associated Y or Z wires. However, the other extremity of pulse 26 in Fig. 2, that is, the right extremity represented at 31, does not provide a sufficient magnetizing force H to pass bend 14 of the hysteresis loop and thus actuate the core to its positive state 16. Consequently, unless a pulse 27 is supplied by the corresponding Y or Z wire, the core is not actuated to its positive state, even though an X pulse 26 is present. The X pulses thus serve to maintain each core 10 in its negative state 15, until a pulse 27 is supplied on a Y wire or Z wire, at which time the combination of current pulses produces a total positive magnetizing force or current represented at 130, which is sufficient to actuate the core to its positive state 16. Following such momentary actuation, and as the pulse 26 becomes negative, the pulse 27 ends, so that the X pulse then acts to return the core to its negative driven state 15.

If the pulses have the magnitudes represented at 26 and 27 in Fig. 2, the circuit is an "or" circuit, that is, a core is actuated to its positive state if either a Y pulse or a Z pulse is present (and added to the X pulse). In this setting of the oscillator, the pulses may typically have the following values as compared with a magnetizing force or current "C" which is required for actuating each core to its positive state:

D. C. component of pulse 26=½ C

A. C. component of pulse 26=⅚ C

D. C. pulse 27=⅖ C

In actual operation, the X and Y pulses are of course fed to the various input lines in very rapid succession, and in accurately timed relation, and act to control the energization of read-out circuits 12 just as rapidly. The method of producing these pulses may vary in different types of computers or other devices, and any of the various known types of pulse control systems may serve the function of the elements generally represented as pulse sources 19 and 119 in Fig. 1. The timer 25 is provided for controlling the exact timing of the D. C. pulses supplied by sources 19, and 119, with respect to the A. C. pulses supplied by oscillator 20. When one of the switches 22, 23 or 24 is closed, the D. C. biased A. C. pulses 26 are supplied repetitively to the corresponding X line. If any of the sources 19 are then in a state for supplying D. C. pulses 27 to the corresponding Y or Z lines, timer 25 so synchronizes these sources 19 and 119 with oscillator 20 as to assure that each pulse 27 adds to or supplements the correspondingly directed portion of the oscillating pulses 26. That is, pulse 27 occurs while the pulse 26 is in a direction such that the magnetizing effect of pulse 26 is in the same direction as pulse 27. Thus, these two combined pulses cause the core to shift to its positive state 16, following which the pulse 27 terminates, and pulse 26 becomes negative to return the core to its negative state 15 until the next pulse 27 occurs. Such actuation of a core 10 to its positive state 16 creates a magnetic field in the vicinity of that core which induces an electrical current in the corresponding read-out line 11, to thus energize read-out circuit 12 which acts to then indicate or otherwise respond to the core actuation.

It will be understood from the above that the Fig. 1 arrangement will serve very effectively to simultaneously control or switch a number of different electrical circuits. The number of circuits associated with each switch 22, 23 or 24 and the corresponding X line may of course be far more than the typically illustrated four circuits. If, for example, switch 22 is closed, the resultant energization of line X1 with repeating D. C. biased A. C. pulses of the type represented at 26 in Fig. 2, causes the cores 10 through which line X1 passes to become responsive to pulses 27 supplied by sources 19 and 119. If any one or more of these sources then supplies a D. C. pulse 27, the combination of that pulse with the pulse 26 in line X1 will cause a corresponding one or more of the upper four cores 10 to shift momentarily to its positive state 16 and then return to its negative state. This shift is indicated by a change in condition of the corresponding read-out circuit or circuits 12, so that four or more read-out circuits 12 (associated with the upper four cores respectively) respond to the control switch 22. Any of the other circuits may be correspondingly closed, to correspondingly actuate the various read-out circuits associated therewith.

The above discussion has assumed a setting of oscillator 20 such that each of the read-out circuits responds if there is present either a Y pulse "or" a Z pulse in the wires passing through the associated core. It is possible to very easily convert or adjust the apparatus for operation as an "and" circuit (instead of an "or" circuit) so that each read-out circuit 12 will respond only if both a Y pulse "and" a Z pulse occur simultaneously within a single core. This is effected by merely reducing the value of the A. C. component supplied to the X wires by oscillator 20. For instance, the A. C. component may be reduced to a value at which the pulses 26a, supplied to the X wires by oscillator 20 and battery 21, have the magnitude represented at 26a in Fig. 2. In these reduced pulses, the D. C. component may still be the same as in pulse 26, so that the center of fluctuation of the magnetizing force or current H is at 40a, while the left and right extremities of the A. C. fluctuation are at 30a and 31a respectively. The point 30a, like the point 30 on the line representing pulse 26, is sufficiently far to the left to normally return the associated core to its negatively driven state 15. The maximum magnetizing force of pulse 26a in a positive direction, represented by point 31a, is sufficiently small that two simultaneous pulses 27a in the Y and Z wires passing through a particular core are required, in conjunction with pulse 26a, to actuate the core magnetically past knee 14 of the hysteresis loop and to the positively driven state 16. Thus, each read-out circuit responds only when both the Y and Z wires passing through the associated core are supplied simultaneously with pulses which correspond with a similarly directed portion of the pulse 26a in an associated X wire.

The adjustment of the X pulses or current to vary the type of response may also be attained by varying the value of the D. C. component or bias voltage of the X wires, rather than by varying the value of the A. C. component. Such adjustment of the D. C. component may of course be attained by regulation of movable contact 122 of potentiometer 22. The potentiometer may be adjusted so that the pulses or current fed to the X lines take the form represented at 26b in Fig. 2, in which the negative D. C. bias is increased to an extent moving the center of fluctuation of the magnetizing force leftward to point 40b, while maintaining the A. C. component the same as in the pulse represented at 26. Such increase in the negative bias has the effect of requiring two pulses 27a, in addition to the X line current, to shift the magnetic state of a core to that represented at 16.

Fig. 3 represents fragmentarily a second form of the invention, and in particular shows a single core 10b of a control system which may be considered as including all of the cores, pulse sources, and other elements shown in Fig. 1. As seen in Fig. 3, each of the cores 10b has passing therethrough a vertical wire Yb, horizontal wires Zb and Xb, and a read-out line 11b all corresponding to the wires shown in Fig. 1. In addition however, there are provided a number of other input wires extending through each of the cores 10b and which are represented typically at 41 and 42. A pulse source 43 or 44 is associated with each of these other input wires, and acts to supply input D. C. pulses to wires 41 and 42 which are supplementary to the Y and Z pulses in their magnetizing effect. Read-out line 11b of each core 10b is of course connected to a read-out circuit, as in Fig. 1.

The D. C. pulses supplied to each of the input lines Yb, Zb, 41 and 42 may be of identical current magnitudes, typically the magnitude represented at 27 or 27a in Fig. 2. The pulses supplied to line Xb may correspond to the pulses represented at 26, 26a, or 26b in Fig. 2, having both an A. C. component and a D. C. component, so that the line Xb acts as a control line for determining what type of indication is given by the read-out circuit. If the pulses supplied to line Xb are great enough to actuate the core to its positive state 16 of Fig. 2 in conjunction with a single pulse in only one of the other input lines Yb, Zb, 41 or 42, then the circuit acts to give a "1 out of N" type of indication. That is, each read-out circuit responds if any one of the input lines is energized (in addition to line Xb). Similarly, the value of the A. C. or D. C. component of the X line current may be changed, as to the values represented at 26a and 26b in Fig. 2, so that the read-out circuit responds only if two out of the four or more input lines are energized, in addition to the X line. Further variation in the current values of the various pulses may adjust the circuit to respond only if three of the inputs are simultaneously energized, or only if four of the inputs are energized, or a greater number if the number of inputs in addition to the X line is greater than four. Thus, there is provided a very flexible arrangement, which is capable of giving any of several different types of indications or responses to the same input signals. Where it is desired that a core respond only if more than two inputs are energized in addition to the X line, it may of course be desirable to reduce the value of the magnetizing force of each pulse 27 or 27a as compared with the total magnetizing force C required to actuate a core from one state to another.

I claim:

1. Computing apparatus of the character described comprising a magnetizable core having a substantially rectangular hysteresis curve, a plurality of input conductors extending in flux linkage relation with said core, means for separately energizing said input conductors respectively with electric input signals tending to shift the core from a first magnetic state to a second, additional conductor means extending in flux linkage relation with said core, electric power supply means for energizing said additional conductor means independently of said input conductors and adjustable between two different conditions for supplying two different electric control signals of different magnetizing strengths respectively to said additional conductor means, said core being constructed to be shiftable from said first magnetic state to the second by the combination of a first of said electric control signals in said additional conductor means and a predetermined number of electric signals in said input conductors, and said core being constructed to also be shiftable from said first magnetic state to the second by a combination of the second of said control signals in said additional conductor means and a second predetermined number of signals in the input conductors but not said first number, whereby adjustment of the energization of said additional conductor means alters the number of input signals to which the core will respond, a read-out line passing in flux linkage relation to said core, and a read-out circuit energized by said read-out line in accordance with the magnetic energization of said core, each of said two control signals in said additional conductor means having both an A. C. component and a D. C. component, and each of said control signals being of a strength to normally and by itself actuate said core to said first magnetic state, but not to said second state except in combination with said input signals in the input conductors.

2. Computing apparatus as recited in claim 1, in which one of said magnetizing strengths of the additional conductor means is such as to shift the core to said second state in response to a combination of signals from said additional conductor means and only one of said input conductors, and the other magnetizing strength of the additional conductor means is such as to shift the core to said second state in response to a combination of signals from the additional conductor means and a predetermined plurality of the input conductors but not merely one.

3. Apparatus as recited in claim 1, in which said energizing means are adjustable to vary said D. C. component as between said two control signals to thereby vary the combination of signals in said input conductors to which the core will respond.

4. Computing apparatus as recited in claim 1, in which said power supply means are adjustable to vary said A. C. component as between said two control signals and to thereby vary the combination of signals in said input conductors to which the core will respond.

5. Apparatus as recited in claim 1, in which said A. C. component is of different values in said two control signals respectively to vary the number of input signals required for shifting the core to said second state.

6. Computing apparatus as recited in claim 5, including means for synchronizing the signals in said input conductors with said signals in said additional conductor means so that the former occur at the same time as, and supplement the magnetizing effect of, the portion of said A. C. component which is opposed to said D. C. component.

7. Apparatus as recited in claim 1, in which said A. C. component of each of said control signals is greater than said D. C. component.

8. Computing apparatus as recited in claim 1, said input signals in the input conductors being uni-directional pulses tending to actuate said core to said second magnetic state but of insufficient strength to do so without said signals in said additional conductor means, said apparatus including means synchronizing said signals in said additional conductor means and said input conductors so that the uni-directional pulses in the latter occur at the same time as the portion of said A. C. component which tends to magnetize the core in the same direction as said input pulses.

9. Computing apparatus as recited in claim 1, including a matrix formed of a plurality of said cores, a plurality of sets of said input conductors extending in different directions past said cores, and a plurality of said control conductor means each being a control conductor extending through a series of cores, said power supply means being adapted to supply either of said control signals selectively to all of said control conductors.

References Cited in the file of this patent

UNITED STATES PATENTS

| | | |
|---|---|---|
| 2,666,151 | Rajchman | Jan. 12, 1954 |
| 2,691,155 | Rosenberg | Oct. 5, 1954 |
| 2,741,757 | Devol et al. | Apr. 10, 1956 |
| 2,763,851 | Haynes | Sept. 18, 1956 |

OTHER REFERENCES

Publication I, Electronic Engineering, May 1954, pp. 192, 199, 340–174.

Publication II, Electronics, April 1953, pp. 146–149.